(12) United States Patent
Klein et al.

(10) Patent No.: US 9,822,210 B2
(45) Date of Patent: Nov. 21, 2017

(54) SYNTHESIS AND USE OF METALLIZED POLYHEDRAL OLIGOMERIC SILSESQUIOXANE CATALYST COMPOSITIONS

(71) Applicant: Huntsman International LLC, The Woodlands, TX (US)

(72) Inventors: Rene Alexander Klein, Hoegaarden (BE); Christina Marinus, Veltem-Beisem (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 15/032,662

(22) PCT Filed: Aug. 7, 2014

(86) PCT No.: PCT/EP2014/067010
§ 371 (c)(1),
(2) Date: Apr. 28, 2016

(87) PCT Pub. No.: WO2015/062759
PCT Pub. Date: May 7, 2015

(65) Prior Publication Data
US 2016/0264708 A1 Sep. 15, 2016

(30) Foreign Application Priority Data

Oct. 28, 2013 (EP) .................................... 13190523

(51) Int. Cl.
| | | |
|---|---|---|
| C08G 18/22 | (2006.01) |
| C08G 18/61 | (2006.01) |
| C08G 77/58 | (2006.01) |
| C08G 77/04 | (2006.01) |
| B01J 31/12 | (2006.01) |
| B01J 31/02 | (2006.01) |

(52) U.S. Cl.
CPC ............ *C08G 18/222* (2013.01); *C08G 18/22* (2013.01); *C08G 18/61* (2013.01); *C08G 77/04* (2013.01); *C08G 77/58* (2013.01); *B01J 31/0212* (2013.01); *B01J 31/125* (2013.01); *B01J 2231/14* (2013.01)

(58) Field of Classification Search
CPC .. B01J 31/0212; B01J 31/125; B01J 2231/14; C08G 18/222; C08G 77/58; C08G 18/61; C08G 18/22; C08G 77/04
See application file for complete search history.

(56) References Cited

U.S. PATENT DOCUMENTS

| | | | |
|---|---|---|---|
| 2009/0082502 A1* | 3/2009 | Lichtenhan | .......... C08G 18/222 524/267 |
| 2010/0125123 A1 | 5/2010 | Lichtenhen et al. | |
| 2012/0264840 A1 | 10/2012 | Klein et al. | |
| 2014/0221544 A1 | 8/2014 | Lichtenhan et al. | |

FOREIGN PATENT DOCUMENTS

| | | |
|---|---|---|
| WO | 2007041344 A | 4/2007 |
| WO | 2008144735 A | 11/2008 |
| WO | 2009065873 A | 5/2009 |
| WO | 2011076570 | 6/2011 |

OTHER PUBLICATIONS

Thomas Maschmeyer et al., "Modelling the active sites of heterogeneous titanium-centred epoxidation catalysts with soluble silsesquioxane analogues", Chemical Communications, 1997, p. 1847-1848, Royal Society of Chemistry GB).

* cited by examiner

*Primary Examiner* — Rabon Sergent
(74) *Attorney, Agent, or Firm* — Huntsman International LLC; Robert Diaz

(57) ABSTRACT

The present invention relates to a method to form a polyurethane material, a catalyst composition comprising metalized polyhedral oligomeric silsesquioxanes (POMS) compounds in combination with reactive compounds suitable to be used to provide a polyurethane material and the polyurethane material obtained using the catalyst composition.

16 Claims, 2 Drawing Sheets

Figure 1:
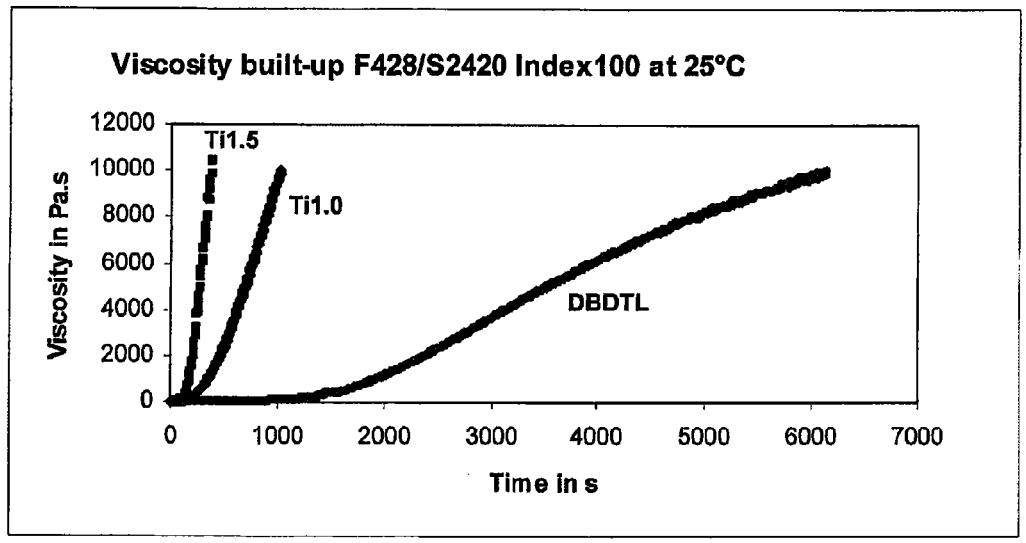

SYNTHESIS AND USE OF METALLIZED POLYHEDRAL OLIGOMERIC SILSESQUIOXANE CATALYST COMPOSITIONS

CROSS-REFERENCE TO RELATED APPLICATIONS

This application is the National Phase of International Application PCT/EP2014/067010 filed Aug. 7, 2014 which designated the U.S. and which claims priority to European App. Serial No. 13190523.4 filed Oct. 28, 2013. The noted applications are incorporated herein by reference.

FIELD OF INVENTION

The present invention relates to a novel catalyst composition comprising metallized polyhedral oligomeric silsesquioxanes (referred to as POMS) suitable for use as a catalyst in forming polyurethane materials.

The present invention hence relates to a method to form a polyurethane material, a catalyst composition in combination with reactive compounds suitable to be used to provide a polyurethane material and the polyurethane material obtained using the catalyst composition.

BACKGROUND OF THE INVENTION

Silsesquioxanes are known in the art and refer to compounds having the empirical chemical formula $RSiO_{3/2}$. These compounds can be used as a support for catalysts and typically have a cage like structure [1] in which n $RSiO_{3/2}$ units are organized in a cage structure with the identity of R typically being an alkyl group. The organized cage like structure is typically referred to as polyhedral oligomeric silsesquioxanes (POSS). The precise combined structure of these $RSiO_{3/2}$ units vary depending on synthesis methods, starting materials and the catalyst used. An example of a silsesquioxane cage structure or in other words polyhedral oligomeric silsesquioxane structure (POSS) in which the four most common units form a cage of n $RSiO_{3/2}$ units in a designated Tn cage structure correspond to following structure [1]:

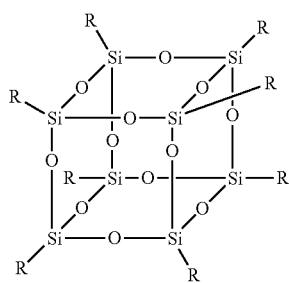

WO200110871 discloses processes for the manufacture of polyhedral oligomeric silsesquioxanes (POSS) which utilize the action of bases that are capable of either attacking silicon or any compound that can react with a protic solvent (e.g. ROH, . . . ) and generate hydroxide [OH], etc. This process may result in a partial POSS cage structure in which the cage structure lacks complete connection of all units in the cage. Said partial POSS cage structures may be referred to as silsesquioxane silanols, a typical example may be Trisilanol POSS which corresponds to the following structure [2]. These trisilanol POSS structures [2] can undergo further additional chemical manipulations to ultimately convert them into POSS-species suitable for polymerization, grafting, or other desirable chemical reactions.

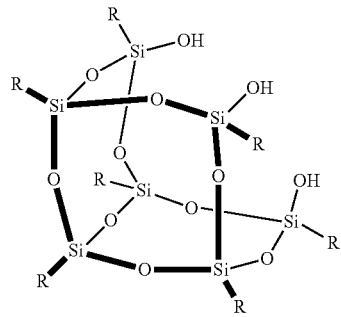

Metalized polyhedral oligomeric silsesquioxane structures (POMS) are known in the art and known to be very suitable for use as catalysts. For example US20100125123 discloses metallized polyhedral oligomeric silsesquioxanes and metallized polyhedral oligomeric silicates for use as cure promoters, catalysts, and alloying agents for the reinforcement of polymer microstructures, including polymer coils, domains, chains, and segments, at the molecular level.

Methods to produce polyurethane materials are well known at present. Various catalysts have been used to promote the gelling and optionally the blowing of the reactive materials in the blend of an isocyanate and an isocyanate reactive component. Various POMS catalysts are known as suitable catalysts for the urethane-bond providing reaction.

WO 2007/041344 mentions metallized nanostructured chemicals as cure promoters. Composite materials comprising polymers (including polyurethanes) and POMS, comprising Ti as metal are mentioned.

WO 2008/144735 discloses metallized polyhedral oligomeric silsesquioxanes, metalized using Ti or Zr, as catalyst as cure promoters for polyurethanes.

WO 2009/065873 discloses polyhedral oligomeric stannasilsesquioxanes as catalyst for polyurethane curing. The polyurethane may be used in coatings, lacquers, paintings, films and polymer compositions and increases the scratch resistance of coatings.

WO2011/076570 discloses a method to form a urethane material, the method comprises blending and reacting at least one isocyanate, at least one isocyanate reactive component and a metallized polyhedral oligomeric silsesquioxane to provide said urethane material, the metallized polyhedral oligomeric silsesquioxane is a dimeric structure containing 2 oligomeric silsesquioxane structures wherein both silsesquioxane structures have a 6-coordinated metal center and wherein both silsesquioxane structures are linked together by means of alkoxides bridging the 6-coordinated metal centers.

For use in polyurethane formation and curing, titanium silsesquioxane compounds corresponding to structure [3] have only very limited activity while titanium silsesquioxane compounds corresponding to structure [4] have moderate activity. Furthermore, titanium silsesquioxane compounds corresponding to structure [4] release VOC. This results from the reaction of the isocyanate reactive component (polyol) with the alkoxy group 2 which renders alcohol as the VOC.

Furthermore all known titanium silsesquioxane compounds, for example those exemplified by structures [3] and [4] below, are microcrystalline solids. In practice, it is preferred to dissolve the additives required for polyurethane formation in one of the main stream ingredients meaning in the isocyanate reactive part (e.g. polyols) or in the isocyanate comprising part. To achieve that a high concentrated solution (catalyst masterbatch) is made first in e.g. a suitable polyol such that the required amount can added as such. As the state of the art titanium silsesquioxane catalytic compounds known till date have very low solubility in polyols a catalyst masterbatch cannot be made and hence the titanium silsesquioxane catalytic compounds first have to be dissolved in a suitable solvent which can be added then to the isocyanate reactive part (e.g. polyol).

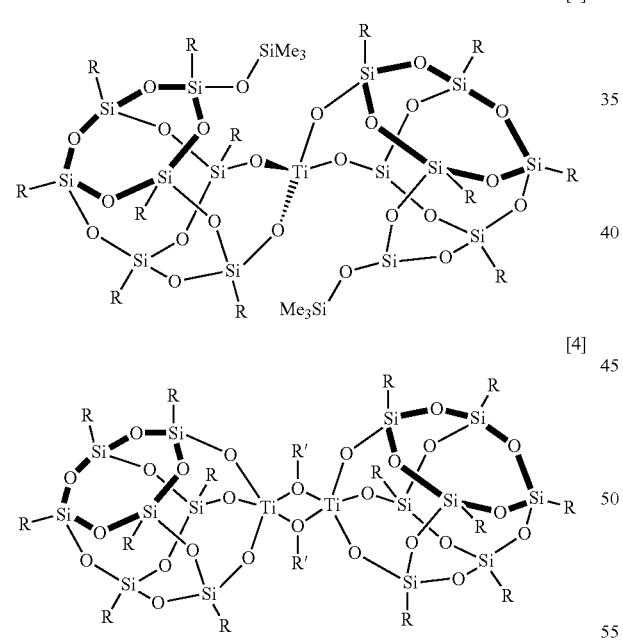

The problem to be solved by the current invention is to provide metal (such as titanium) silsesquioxane catalytic compounds with improved catalytic activity, in particular for polyurethane formation and curing.

Furthermore it is the goal to provide metal (such as titanium) silsesquioxane catalytic compounds which have good solubility in polyols which makes it possible to make a catalyst masterbatch in e.g. the polyols used as isocyanate reactives in polyurethane formation.

SUMMARY OF THE INVENTION

According to a first aspect of the present invention, a method is disclosed to form a polyurethane material.

According to embodiments of the first aspect said method disclosed to form a polyurethane material comprises the steps of:

providing at least one isocyanate;

providing at least one isocyanate reactive component;

providing a catalyst composition, said catalyst composition comprising metalized polyhedral oligomeric silsesquioxanes (POMS) compounds wherein:

said POMS compounds are reaction products of metallic alkoxides and silsesquioxane silanols, in particular silsesquioxane trisilanols corresponding to structure [2], and

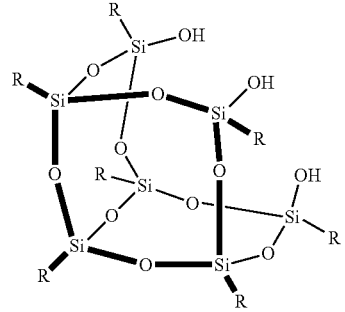

the number of equivalents of silsesquioxane silanols used is higher than the number of equivalents of metallic alkoxides used to react with said silsesquioxane silanols, R is selected from an alkyl group, preferably a linear, branched or cyclic aliphatic group, preferably comprising 1 to 20 carbon atoms, most preferred an i- or n-butyl group or an i- or n-octyl group.

blending and reacting said at least one isocyanate, at least one isocyanate reactive component and said catalyst composition to provide said polyurethane material.

According to embodiments of the first aspect the metal in the metallic alkoxide used for making the catalyst composition is selected from a 4 and/or 5 coordinated metal which is selected from s, p, d, f, block metals, more preferably said metal is selected from Ti, Zr, B, Al and Sn, most preferably the metallic alkoxide compound is titanium tetra alkoxide, $Ti(OR)_4$.

According to embodiments of the first aspect the ratio of the number of equivalents of silsesquioxane silanols, in particular silsesquioxane trisilanols over the number of equivalents of metallic alkoxides used for making the catalyst composition is in the range 1.5:1 up to 2:1.

According to embodiments of the first aspect the catalyst composition used to form the polyurethane material is a mixture comprising following intermediate POMS structures [8], [9], [10] and [11] in a dynamic equilibrium:

[8]

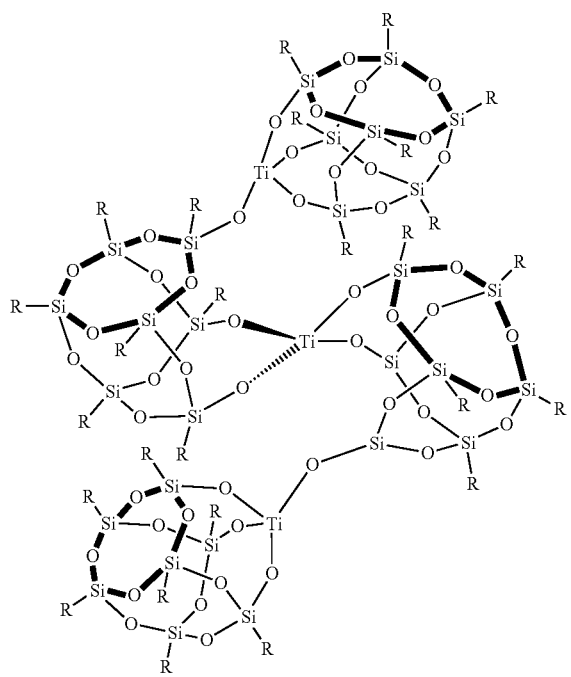

[9]

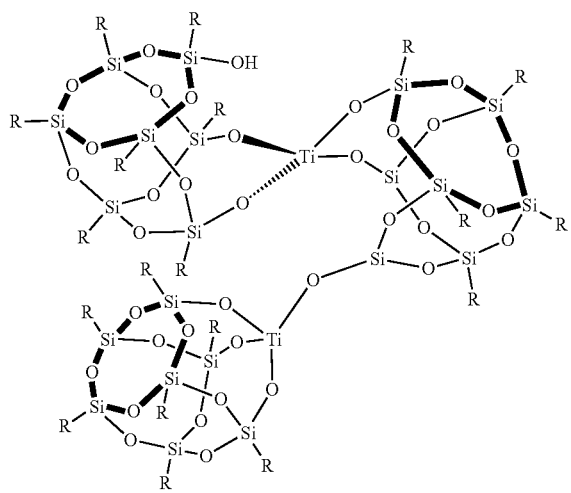

[10]

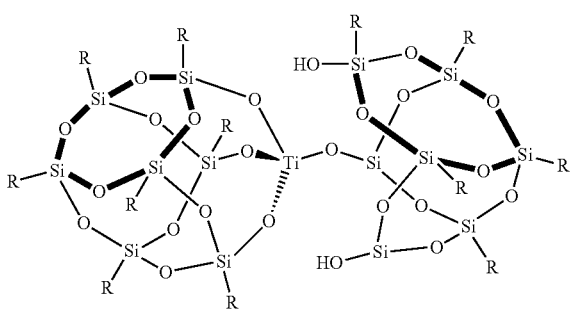

-continued

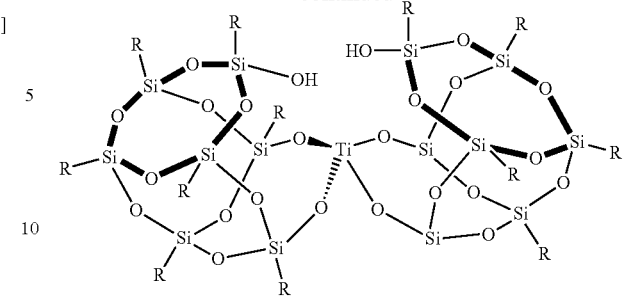

[11]

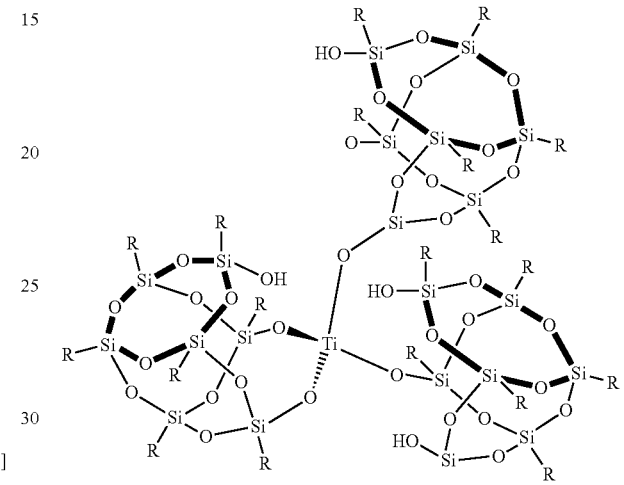

Wherein R is selected from an alkyl group, preferably a linear, branched or cyclic aliphatic group, preferably comprising 1 to 20 carbon atoms, most preferred an i- or n-butyl group or an i- or n-octyl group.

According to embodiments of the first aspect the method to form a polyurethane material comprises said metallized polyhedral oligomeric silsesquioxane is incorporated into an isocyanate reactive component before blending said at least one isocyanate, at least one isocyanate reactive component and said catalyst composition. The composition comprising the POMS catalyst according to the invention and at least one isocyanate reactive component which is suitable to dissolve the POMS catalyst is also referred to as "catalyst/polyol masterbatch"

According to embodiments the isocyanate reactive component suitable to dissolve the POMS catalyst is selected from monools and/or polyols such as glycols, high molecular weight polyether polyols and polyester polyols, mercaptans, carboxylic acids such as polybasic acids, amines, polyamines, components comprising at least one alcohol group and at least one amine group such as polyaminepolyols, urea and amides.

According to embodiments the isocyanate reactive component is selected from monools or polyols which have an average nominal hydroxy functionality of 1-8 and an average molecular weight of 32-8000 and mixtures of said monools and/or polyols.

According to embodiments the isocyanate reactive component is selected from monools selected from methanol, ethanol, propanol, butanol, phenol, cyclohexanol and hydrocarbon monools having an average molecular weight of 200-5000 like aliphatic and polyether monools and/or polyols selected from ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having a molecular weight of up to 8000, preferably 200-6000 polyester polyols having an average molecular weight of 200-8000, preferably 200-6000, polyether polyester polyols having an average molecular weight of 200-8000, preferably 200-6000 and polyether polyols having an average molecular weight of 200-8000, preferably 200-6000.

According to embodiments of the first aspect the method to form a polyurethane material comprises the blending of said at least one isocyanate, at least one isocyanate reactive component and said catalyst composition is done at a temperature between −10° C. and 25° C.

According to embodiments of the first aspect the method to form a polyurethane material comprises said blend of said at least one isocyanate, at least one isocyanate reactive component and said metallized polyhedral oligomeric silsesquioxane is brought to a temperature between 25° C. and 200° C. to initiate the reaction of said at least one isocyanate, at least one isocyanate reactive component and said catalyst composition.

According to embodiments of the first aspect the method to form a polyurethane material comprises at least one gelling catalyst is provided to said blend of said at least one isocyanate, at least one isocyanate reactive component and said catalyst composition.

According to embodiments of the first aspect the method to form a polyurethane material comprises at least one blowing catalyst is provided to said blend of said at least one isocyanate, at least one isocyanate reactive component and said catalyst composition.

According to embodiments of the first aspect the method to form a polyurethane material comprises the concentration of said metallized polyhedral oligomeric silsesquioxane in said blend of said at least one isocyanate, at least one isocyanate reactive component and said catalyst composition is less than or equal to 10 mM.

According to a second aspect of the present invention, a reactive composition is disclosed, said reactive composition comprising at least one isocyanate component; at least one isocyanate reactive component and a catalyst composition according to the first aspect of the invention.

According to a third aspect of the present invention, a polyurethane material is disclosed thereby using the method according to the first aspect of the invention.

The independent and dependent claims set out particular and preferred features of the invention. Features from the dependent claims may be combined with features of the independent or other dependent claims as appropriate.

The above and other characteristics, features and advantages of the present invention will become apparent from the detailed description and examples set out further.

FIGURES

FIG. 1 shows the increase of viscosity during reaction into a polyurethane material of a reactive composition according to an aspect of the present invention.

Figure 2:
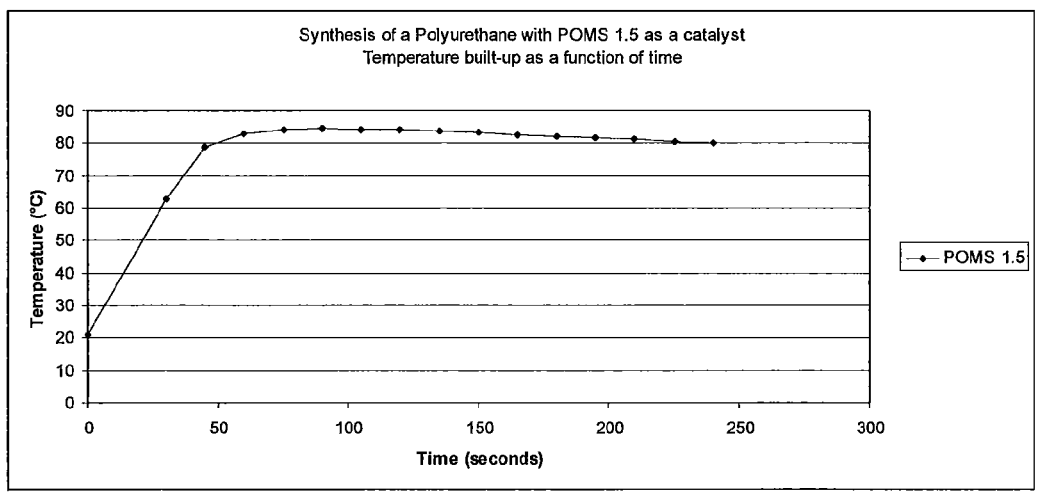
Figure 3:
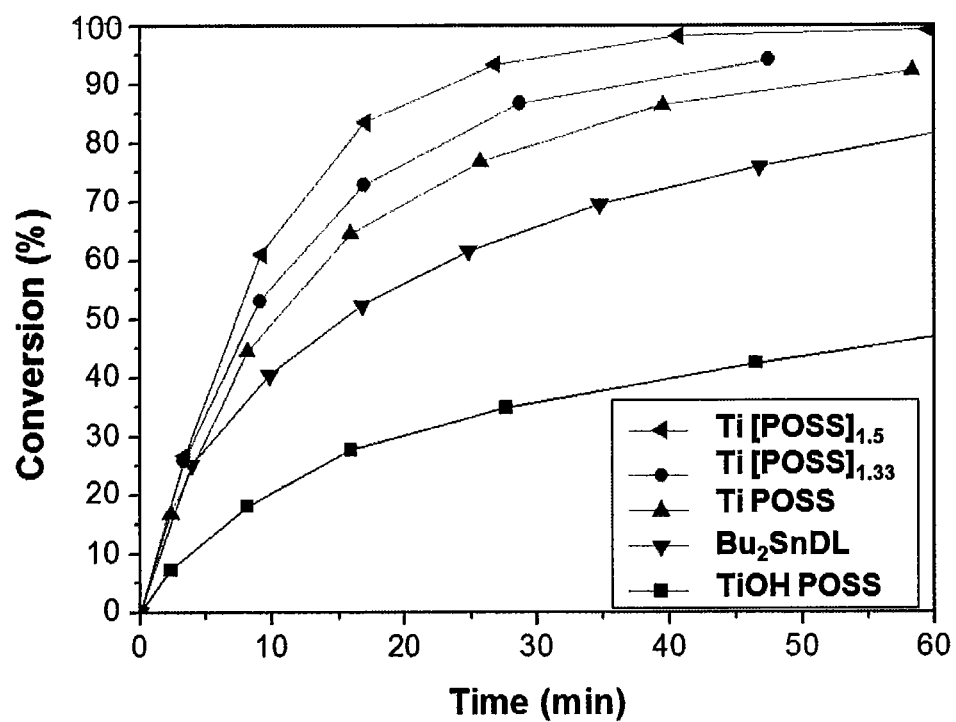

FIG. 2 illustrates the temperature as a function of time during reaction into a polyurethane material of a reactive composition according to an aspect of the present invention FIG. 3: illustrates conversion versus time for the relative reduction of phenylisocyanate (PhNCO) on a molar basis in the reactive composition during forming of the urethane, PhNCO being converted into a urethane, PhNHCOOnBu (see FIG. 1) thereby using the catalyst according to the present invention.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It has surprisingly be found that the use of a specific metallized polyhedral oligomeric silsesquioxanes (POMS) composition enables to provide a method to form polyurethane material, which method has a significant improved reactivity and compatibility compared to a state of the art POMS catalyst. This improved reactivity has the advantage that less catalyst is required to obtain similar reactivity.

The catalyst composition according to the invention comprises metallized polyhedral oligomeric silsesquioxanes (POMS) and is a mixture comprising at least POMS compounds having a polymeric structure.

Further, the POMS composition according to the invention may be made in such a way that it is compatible with one or more of the reactive components suitable for providing a polyurethane material, said reactive components being at least one isocyanate component and at least one isocyanate reactive component (e.g. a polyetherpolyol). This has the advantage that the catalyst composition may be added directly into one of said reactive components suitable for providing a polyurethane material and hence eliminates the requirement of a solvent for the catalyst composition. Dissolving the catalyst directly into one or more of the reactive components is beneficial since that will reduce the VOC's of the final polyurethane material.

Furthermore, because the catalyst compositions according to the invention are hydrolytically very stable and may be dissolved in the reactive components for providing a polyurethane material makes it possible to achieve a very storage stable blend.

It was surprisingly found that state of the art metallic (e.g.) titanium silsesquioxane compounds corresponding to structure [4] do react further with silsesquioxane silanols and form novel metallic (e.g. titanium) silsesquioxane compositions according to the invention and which surprisingly exhibit enhanced catalytic activity (e.g. in polyurethane formation). In particular silsesquioxane trisilanols enable said direct reaction.

Said metallic (e.g. titanium) silsesquioxane compositions according to the invention may be used as catalyst in polyurethane formation and have the advantage that they do no longer eliminate VOCs in the final polyurethane material.

Surprisingly, attempts to isolate a single molecular defined compound after forming the novel metallic (e.g. titanium) silsesquioxane composition according to the invention e.g. after reaction metallic alkoxides e.g. titanium tetra alkoxide, Ti(OR)$_4$, with more than one equivalent of silsesquioxane trisilanol, failed. Instead of forming microcrystalline solids corresponding to one single compound, mixtures of oligomeric metallic (e.g. titanium) silsesquioxane derivatives are obtained.

One should note that the possible compounds (species) present in the novel metallic (e.g. titanium) silsesquioxane composition according to the invention can be in equilibrium with each other but that several of these compounds can also eliminate silsesquioxane silanols that can, again, engage in chemical equilibria with other titanium silsesquioxane species present.

Surprisingly, it was found that the compositions of oligomeric titanium silsesquioxane derivatives blend very well with polyols. This enables the convenient production of polyol/catalyst masterbatches. Upon application as catalyst in polyurethane formation, these do not liberate VOCs. It was further found that the new metallic (e.g. titanium) silsesquioxane composition according to the invention have a very high activity as polyurethane initiators.

The catalyst composition according to the present invention hence comprises a mixture of metallized polyhedral oligomeric silsesquioxane (POMS) compounds which are reaction products of silsesquioxane silanols, in particular silsesquioxane trisilanols as illustrated in structure [2] and metallic alkoxides. Said silsesquioxane silanol compounds are further in the application also referred to as silanol POSS, said silsesquioxane trisilanols are further in the application also referred to as trisilanol POSS.

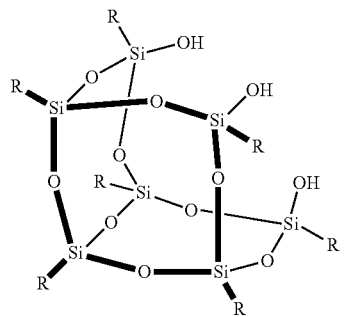

[2]

In order to form the new metalized polyhedral oligomeric silsesquioxanes (POMS) catalyst composition according to the present invention the number of equivalents of silsesquioxane silanols, in particular silsesquioxane trisilanols must be higher than the number of equivalents of metallic alkoxides to be reacted with said silsesquioxane silanols. In other words the ratio of equivalents of [silanol POSS]: [metallic alkoxides] must be higher than 1.

According to embodiments the ratio of the number of equivalents of silsesquioxane silanols, in particular silsesquioxane trisilanols over the number of equivalents of metallic alkoxides is 2:1.

According to embodiments, the suitable metallic alkoxides e.g. titanium tetra alkoxide, Ti(OR)$_4$ react with the silanol groups in the silsesquioxane silanols, in particular silsesquioxane trisilanols, in order to form the metalized polyhedral oligomeric silsesquioxanes (POMS) structures according to the present invention.

According to embodiments, one equivalent of metallic alkoxides e.g. titanium tetra alkoxide, Ti(OR)$_4$ may react with silanol groups being present in several silsesquioxane silanols, in particular silsesquioxane trisilanols, and may hence lead to following intermediate POMS structures [5], [6], [7]. Said intermediate POMS structure may further react, or in other words the remaining silanol groups may further react with remaining metal equivalents and silsesquioxane silanol equivalents, in particular silsesquioxane trisilanol equivalents to form the metalized polyhedral oligomeric silsesquioxanes (POMS) structures according to the present invention.

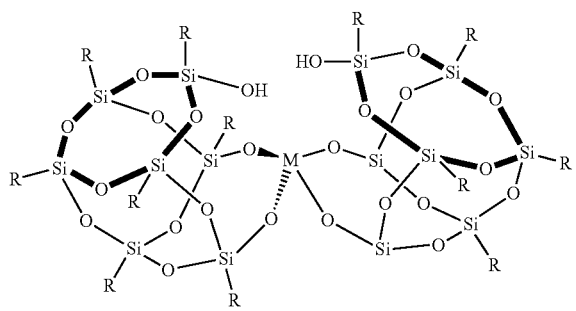

[5]

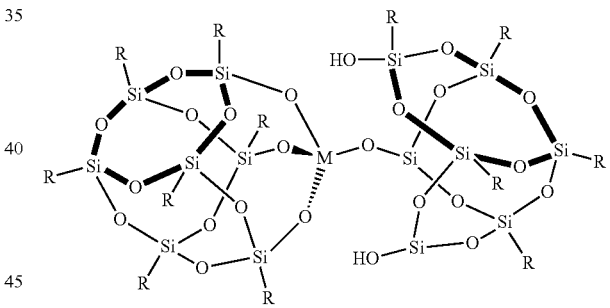

[6]

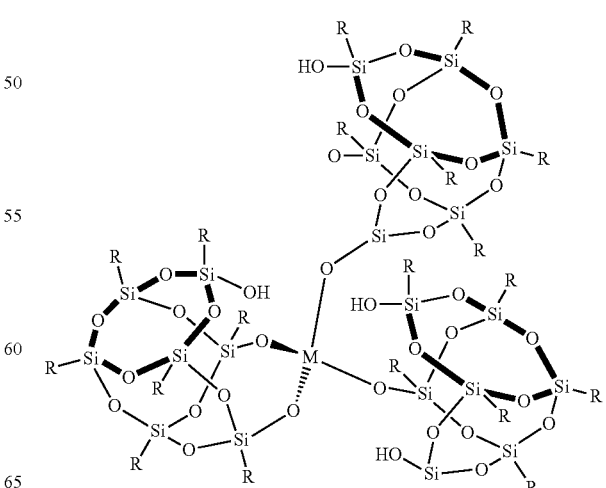

[7]

According to embodiments the metal M in the metallic alkoxide compound is selected from a 4 and/or 5 coordinated metal which is selected from s, p, d, f, block metals.

According to preferred embodiments, the metal being present in the metallic alkoxides may be selected from Ti, Zr, B, Al and Sn.

According to preferred embodiments the metallic alkoxide compound is titanium tetra alkoxide, Ti(OR)$_4$.

According to embodiments, the silsesquioxane silanols, in particular silsesquioxane trisilanols correspond to the aforementioned structure [2] wherein R may be selected from an alkyl group, preferably a linear, branched or cyclic aliphatic group, preferably comprising 1 to 20 carbon atoms, also referred to as a C1 to C20 group, most preferred an i- or n-butyl group or an i- or n-octyl group. Such a group, coupled to a Si-atom in the POMS structure, is referred to as a ligand. The R groups being present in the silsesquioxane trisilanols may all be different, or some of them may be identical to each other, whereas not all these ligands are identical. Most preferred, all R groups are identical.

Some of the many possible novel metallic (here shown for titanium but the invention not limited to Ti) silsesquioxane POMS compounds species which are present in these mixtures in a dynamic equilibrium are exemplified by the structures [8], [9], [10] and [11] shown below.

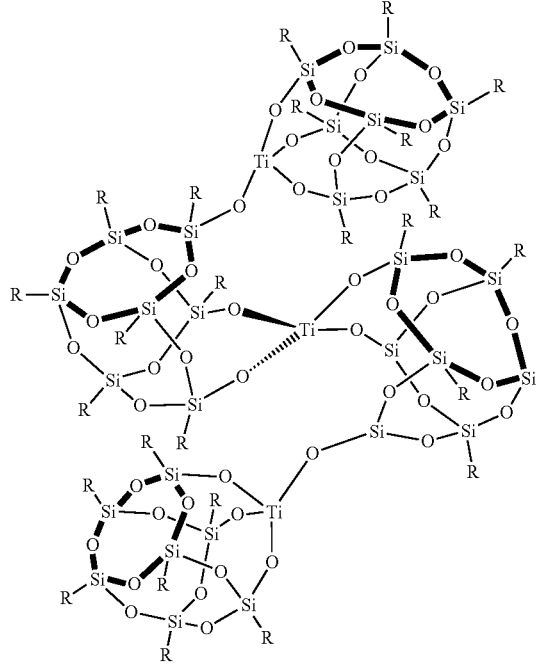

[Ti(POSS)$_{1-33}$]

[8]

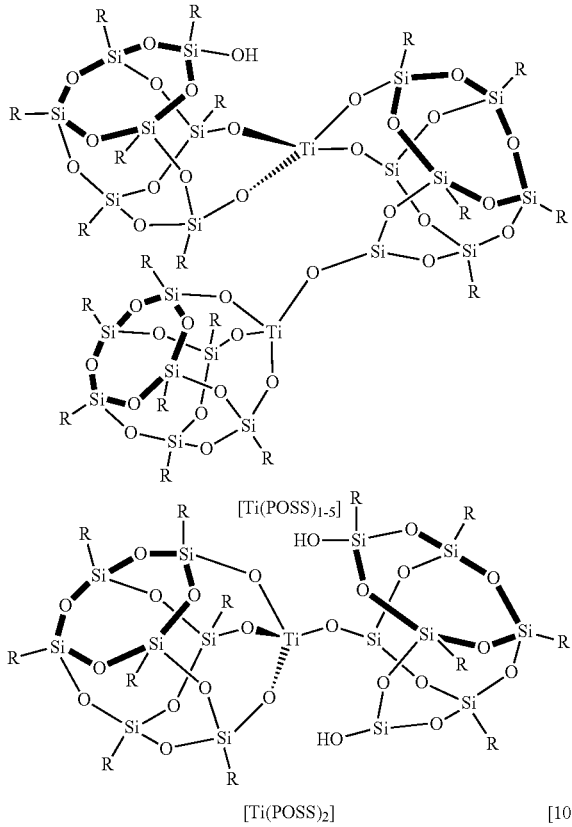

[Ti(POSS)$_{1-5}$]

[Ti(POSS)$_2$]

[9]

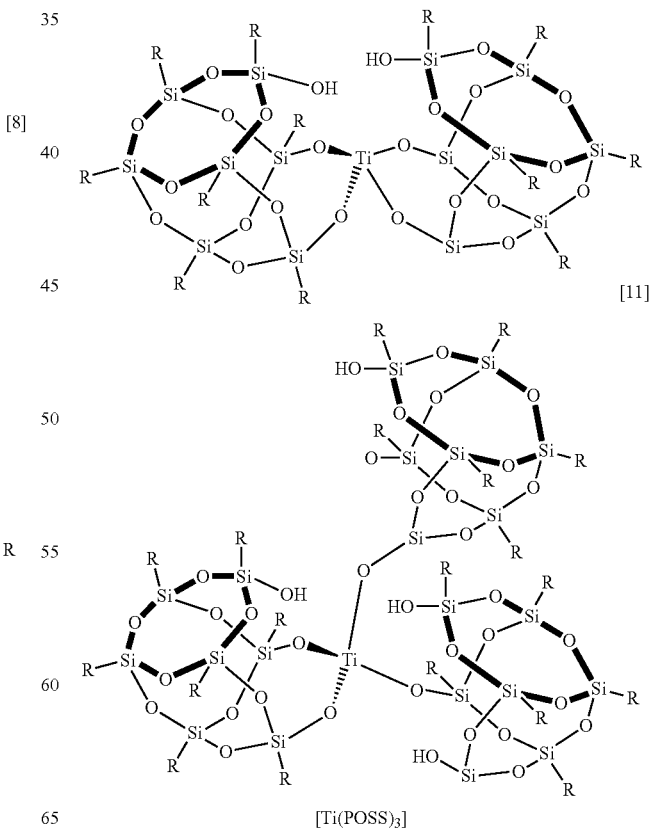

[Ti(POSS)$_3$]

[10]

[11]

According to embodiments, the ratio of the total number of equivalents of silsesquioxane trisilanols over the total number of equivalents of Ti metal compounds (e.g. Ti(OR)$_4$) used to fabricate the catalytic POMS composition according to the invention is in the range of 1.5 up to 2. The resulting catalytic POMS composition may comprise a mixture of aforementioned structures [8], [9], [10] and [11].

According to embodiments, the catalytic POMS composition according to the invention corresponds to the average formula Ti(POSS)$_2$ wherein the total number of equivalents of silsesquioxane trisilanols used over the total number of equivalents of Ti metal compounds (e.g. Ti(OR)$_4$) used is 2. Said preferred catalytic POMS composition may be a mixture of aforementioned structures [8], [9], [10] and [11].

According to embodiments, the catalytic POMS composition according to the invention corresponds to the average formula Ti(POSS)$_{1.5}$ wherein the total number of equivalents of silsesquioxane trisilanols used over the total number of equivalents of Ti metal compounds (e.g. Ti(OR)$_4$) used is 1.5. Said preferred catalytic POMS composition may be a mixture of aforementioned structures [8], [9], [10] and [11].

According to embodiments, the resulting metalized polyhedral oligomeric silsesquioxanes (POMS) catalyst composition is a mixture of several oligomeric metallic (e.g. titanium) silsesquioxane derivatives described and cited above.

The catalytic POMS compositions according to the invention may be prepared by reaction of metallic alkoxides e.g. titanium tetra alkoxide, Ti(OR)$_4$, with more than one equivalent of silsesquioxane trisilanol.

Alternatively the catalytic POMS compositions according to the invention may be prepared by adding additional silsesquioxane silanols, in particular silsesquioxane trisilanols to a state of the art catalytic composition comprising metallic (e.g. titanium) silsesquioxane compounds corresponding to structure [4]. In this reaction, the alkoxy group present in state of the art structure [4] is lost and new metallic (e.g. titanium) silsesquioxane bondings are formed.

An example of a possible synthesis reaction is shown below wherein silsesquioxane trisilanols are reacted with titanium tetra alkoxide, Ti(OR)$_4$ as metallic alkoxide compound

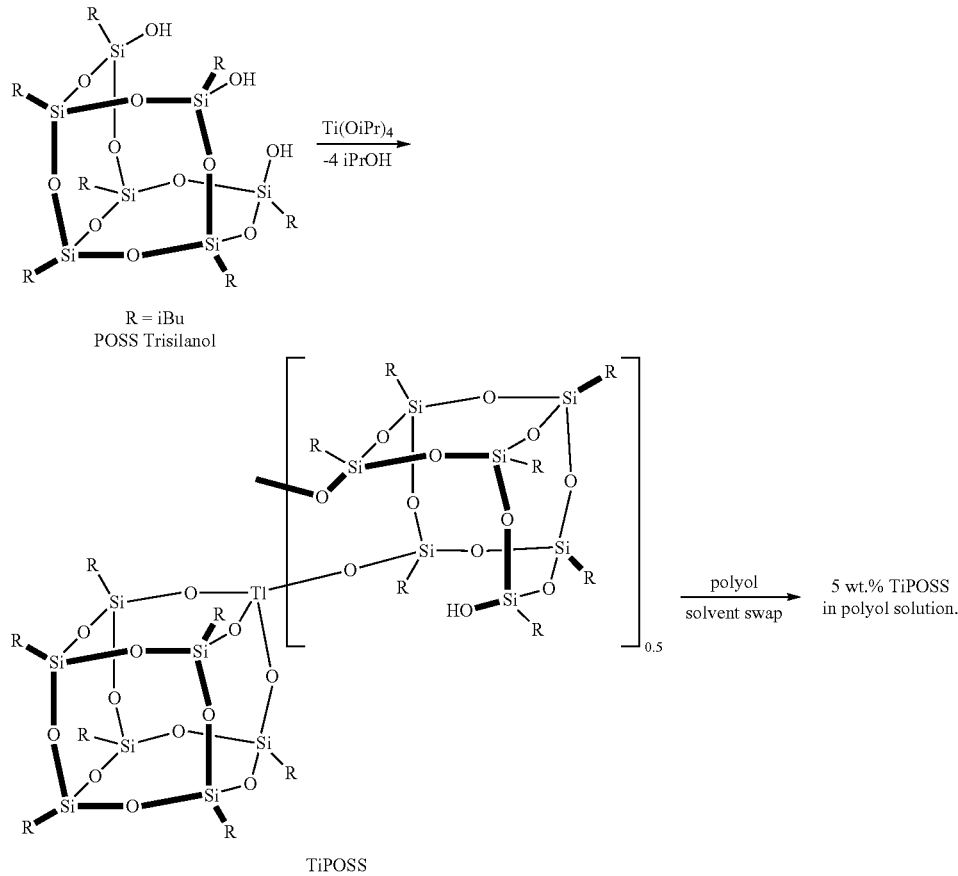

According to embodiments, reactive compositions suitable for fabricating a polyurethane material are disclosed comprising the POMS catalyst composition according to the present invention Since the POMS catalyst compositions used in reactive compositions suitable for fabricating a polyurethane material are hydrolytically more stable than organometallic catalysts, a long storage stability and maintained reactivity is guaranteed.

As such, the reactive composition may be more easily transported and may be provided as a fit-for-use composition to producers of urethane materials, typically polyurethane materials.

According to embodiments a reactive composition is provided suitable for forming polyurethane materials. Said reactive composition suitable for fabricating a polyurethane material comprises:

at least one isocyanate compound;
at least one isocyanate reactive component;
a metalized polyhedral oligomeric silsesquioxanes (POMS) catalyst composition according to the invention It is clear that features of the metals, alcohol ligands, alkoxides, and any other feature as set out in relation to the catalyst composition according to the invention applies to the reactive composition in a similar, optionally even an identical way.

According to embodiments a method to form a polyurethane material is provided. The method comprises the steps of:
providing at least one isocyanate compound;
providing at least one isocyanate reactive component;
providing the metalized polyhedral oligomeric silsesquioxanes (POMS) catalyst composition according to the invention;
blending and reacting the at least one isocyanate, at least one isocyanate reactive component and the metalized polyhedral oligomeric silsesquioxanes (POMS) catalyst composition to provide the urethane material characterized in that the catalyst composition comprises a mixture of metallized polyhedral oligomeric silsesquioxane (POMS) compounds which are reaction products of silsesquioxane silanols, in particular silsesquioxane trisilanols [2] and metallic alkoxides, and wherein the number of equivalents of silsesquioxane silanols, in particular silsesquioxane trisilanols is higher than the number of equivalents of metallic alkoxides to be reacted with said silsesquioxane silanols.

It is also here clear that features of the metals, alcohol ligands, alkoxides, and any other feature as set out in relation to the catalyst composition according to the invention applies to the method to form a polyurethane material in a similar, optionally even an identical way.

According to some embodiments, the metalized polyhedral oligomeric silsesquioxanes (POMS) catalyst composition according to the present invention may be incorporated into an isocyanate reactive component before blending the at least one isocyanate, at least one isocyanate reactive component and the metallized polyhedral oligomeric silsesquioxane. The composition comprising the POMS catalyst composition and an isocyanate reactive component is also referred to as "polyol/catalyst masterbatch".

According to embodiments the polyol/catalyst masterbatch according to the invention comprises at least the POMS catalyst composition according to the invention and a component suitable for dissolving the POMS catalyst and suitable as an isocyanate reactive component.

According to embodiments, the component suitable for dissolving the POMS catalyst and as isocyanate reactive component is selected from monools and/or polyols such as glycols or even relatively high molecular weight polyether polyols and polyester polyols, mercaptans, carboxylic acids such as polybasic acids, amines, polyamines, components comprising at least one alcohol group and at least one amine group, such as polyaminepolyols, urea and amides.

According to embodiments, the component suitable for dissolving the POMS catalyst and as isocyanate reactive component is selected from monools and/or polyols which have an average nominal hydroxy functionality of 1-8 and an average molecular weight of 32-8000. Mixtures of monools and/or polyols may be used as well.

Examples of suitable monools are methanol, ethanol, propanol, butanol, phenol, cyclohexanol and hydrocarbon monools having an average molecular weight of 200-5000 like aliphatic and polyether monools.

Examples of suitable polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having a molecular weight of up to 8000, polyester polyols having an average molecular weight of 200-8000, polyether polyester polyols having an average molecular weight of 200-8000 and polyether polyols having an average molecular weight of 200-8000.

Such monools and polyols are commercially available. Useful examples are Daltocel® F555 and Daltocel® F442, which are all polyether triols from Huntsman, Voranol® P400 and Alcupol® R1610, which are polyether polyols from DOW and Repsol, respectively, and Priplast® 1838 and 3196 which are high molecular weight polyester polyols from Croda, and Capa® 2043 polyol, a linear polyesterdiol of average MW of about 400 from Perstorp, and K-flex® polyols 188 and A308 which are polyester polyols from King Industries having a MW of about 500 and 430 respectively, and aromatic polyester polyols like Stepanpol® PH56 and BC180 having average molecular weights of about 2000 and 600 respectively, and Neodol® 23E which is an aliphatic monool from Shell.

Most preferred polyols are polyester and polyether polyols having an average molecular weight of 200-6000 and an average nominal functionality of 2-4.

According to some embodiments, the blending of the at least one isocyanate, at least one isocyanate reactive component and the metalized polyhedral oligomeric silsesquioxanes (POMS) catalyst composition according to the present invention may be done at a temperature between −10° C. and 25° C.

According to some embodiments, the blend of the at least one isocyanate, at least one isocyanate reactive component and the metalized polyhedral oligomeric silsesquioxanes (POMS) catalyst composition according to the present invention may be brought to a temperature between 25° C. and 200° C. to initiate the reaction of the at least one isocyanate, at least one isocyanate reactive component and the metallized polyhedral oligomeric silsesquioxane.

In the methods according to the present invention, the amount of potential harmful metals such as mercury and tin and/or the amount of potential odorous organic compounds such as amines, which are commonly used as polyurethane catalyst, may be partially or completely replaced by metalized polyhedral oligomeric silsesquioxanes (POMS) catalyst composition according to the present invention.

The metalized polyhedral oligomeric silsesquioxanes (POMS) catalyst composition according to the present invention used in the method according to this invention are hydrolytically very stable in comparison to other organometallic complexes. This leads to a high storage stability and the catalyst can be stored for at least 12 months with very limited, or even without deterioration of the catalyst activity.

The metalized polyhedral oligomeric silsesquioxanes (POMS) catalyst composition according to the present invention used in the method for forming polyurethane materials are very compatible with the isocyanate or isocyanates and/or the isocyanate reactive component. In general, they are that compatible such that the use of a solvent to bring the POMS in the isocyanate or isocyanates and/or the isocyanate reactive component can be avoided, leading to a low VOC catalyst system.

Suitable isocyanate compounds are polyisocyanates. Polyisocyanate components are polyisocyanates of the type R—(NCO)$_x$ with x at least 2 and R being an aromatic or aliphatic group, such as diphenylmethane, toluene, dicyclohexylmethane, hexamethylene, or a similar polyisocyanate.

Suitable isocyanate compounds may comprise one or more polyisocyanates, including but not limited to polyisocyanates selected from the group consisting of toluene diisocyanates (TDI), diphenylmethane diisocyanate (MDI)-type isocyanates, and prepolymers of these isocyanates. Preferably the polyisocyanate components may have at least two aromatic rings in its structure, and are liquid products. Polymeric isocyanates having a functionality greater than 2 may be used.

Examples of suitable polyisocyanates are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl) methane, e.g. 4,4'-diisocyanatodicyclohexylmethane (H$_{12}$MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with components containing isocyanate-reactive hydrogen atoms forming polymeric polyisocyanates or so-called prepolymers.

Preferably toluene diisocyanates (TDI), diphenylmethane diisocyanate (MDI)-type isocyanates, and prepolymers of these isocyanates are used.

According to some embodiments, a polyurethane material may be provided.

According to some embodiments, at least one gelling catalyst may be provided to the blend of at least one isocyanate, at least one isocyanate reactive component and the metallized polyhedral oligomeric silsesquioxane.

The metalized polyhedral oligomeric silsesquioxanes (POMS) catalyst composition according to the present invention used in a method for forming a polyurethane material may be used in combination with one or more gelling catalysts without antagonistic effect.

Any catalyst suitable to be used as gelling catalyst in the production of a polyurethane material may be used. Most preferred, a combination of the POMS catalyst according to the present invention with a gelling catalyst known to those skilled in the art According to some embodiments, at least one blowing catalyst may be provided to the blend of at least one isocyanate, at least one isocyanate reactive component and metalized polyhedral oligomeric silsesquioxanes (POMS) catalyst composition according to the present invention.

The metalized polyhedral oligomeric silsesquioxanes (POMS) catalyst composition according to the present invention used in a method for forming a polyurethane material may be used in combination with one or more blowing catalysts without antagonistic effect.

Any catalyst suitable to be used as blowing catalyst in the production of a polyurethane material may be used. Most preferred, a combination of the used metalized polyhedral oligomeric silsesquioxanes (POMS) catalyst composition according to the present invention in a method for forming a polyurethane material may be used in combination with a blowing catalyst known to those skilled in the art.

It is understood that a combination of the metalized polyhedral oligomeric silsesquioxanes (POMS) catalyst composition according to the present invention used in a method for forming a polyurethane material may be combined with one or more gelling catalysts and one or more blowing catalysts.

It is also understood that the blend of the at least one isocyanate, at least one isocyanate reactive component and metalized polyhedral oligomeric silsesquioxanes (POMS) catalyst composition according to the present invention used in a method for forming a polyurethane material may further be provided with additional components such as solvents, e.g. toluene, fire retardants, antioxidants, surfactants, physical or chemical blowing agents, fillers, pigments, or any other typical additives used in polyurethane materials.

According to some embodiments, the concentration of the metalized polyhedral oligomeric silsesquioxanes (POMS) catalyst composition according to the present invention in the blend of the at least one isocyanate, at least one isocyanate reactive component and metalized polyhedral oligomeric silsesquioxanes (POMS) catalyst composition according to the present invention may be less than or equal to 10 mM (this concentration expressed in mM is to be understood as millimolar, being the amount of millimole of the catalyst composition per liter of the said reactive mixture).

More preferred, the concentration of the metalized polyhedral oligomeric silsesquioxanes (POMS) catalyst composition according to the present invention is less than or equal to 5 mM, even more preferred less than or equal to 1 mM, even less than or equal to 0.5 mM.

According to embodiments of the present invention, a polyurethane material is provided. The polyurethane material is obtainable by one of the methods according to the present invention to form a urethane material.

The reactive composition according to present invention may be used to provide a polyurethane material A polyurethane material according to the present invention may have a low VOC compared to polyurethane materials made by known amine catalyst, in particular using non-reactive amine catalysts.

The use of undesired metal such as tin or mercury being part of catalysts may be avoided to some extend, even may be completely avoided.

The polyurethane material according to the present invention may be a rigid, semi-flexible or flexible foam. The polyurethane material may also be thermoplastic polyurethane material, an elastomeric polyurethane. The polyurethane material may also be a polyurethane coating.

It is to be understood that although preferred embodiments and/or materials have been discussed for providing embodiments according to the present invention, various modifications or changes may be made without departing from the scope and spirit of this invention.

EXAMPLES

Synthesis of [Ti(POSS)1.5] as a 5 wt. % Masterbatch in Polyol

To a suspension of isobutyl trisilanol POSS (99.27 g, 125.43 mmol, iBu$_7$Si$_7$O$_9$(OH)$_3$) in 366 mL of hexanes is added titanium isopropoxide (25.2 mL, 83.2 mmol). Subsequently, the mixture is heated to 50-67° C. for a period of 60-180 minutes. After this period the hexanes solvent and isopropanol are removed through distillation. Removal of last traces of solvents under reduced pressure affords [Ti (POSS)1.5] as a viscous, colorless oil.

Instead of hexanes, DCM, toluene, ethylbenzene or other non protic solvents can be employed. The amount of titanium isopropoxide can be varied to achieve other ratios of POSS to Ti.

Synthesis of [Ti(POSS)1.5] as a 10 wt. % Solution in Toluene

To a suspension of isobutyl trisilanol POSS (99.27 g, 125.43 mmol, iBu$_7$Si$_7$O$_9$(OH)$_3$) in 366 mL of hexanes is added titanium isopropoxide (25.2 mL, 83.2 mmol). Subsequently, the mixture is heated to 50-67° C. for a period of 60-180 minutes. After this period toluene (1200 g) is added and the mixture is further heated to reflux for a period of 30 to 180 minutes which enables to remove the hexanes solvent, isopropanol co product and part of the toluene solvent through distillation. Distillation is stopped when the desired concentration of [Ti(POSS)1.5] is reached.

Instead of hexanes, DCM, toluene, ethylbenzene or other non protic solvents can be employed. The amount of titanium isopropoxide can be varied to achieve other ratios of POSS to Ti. The solvent swap may also be conducted under reduced pressure. The distillation step can be prolonged to afford highly concentrated [Ti(POSS)1.5] solutions.

Synthesis of [Ti(POSS)1.5] as a 5 wt. % Masterbatch in Polyol

To a solution of isobutyl trisilanol POSS (47 g, 59 mmol) in 175 mL of hexanes is added titanium isopropoxide (11.5 mL, 38 mmol). Subsequently, the mixture is heated to 50-67° C. for a period of 60-180 minutes. After this period Daltocel F428 (950 g) is added and the mixture is further heated to 80-150° C. for a period of 30 to 180 minutes which enables to remove the hexanes solvent through distillation. After cooling to room temperature, the masterbatch is a clear liquid, free of insoluble residues.

Instead of hexanes, toluene or other non protic solvents can be employed. The amount of titanium isopropoxide can be varied to achieve other ratios of POSS to Ti. The solvent swap may also be conducted under reduced pressure.

Catalytic Activity for Urethane Formation Reaction

In a first experiment, a method according to the present invention is compared with a method using a bench mark catalyst or known POMS catalyst. In particular as bench mark catalysts dibutyl tin dilaureate (Bu$_2$SnDL), iBu$_7$Si$_7$O$_{12}$Al (Al POSS), iBu$_7$Si$_7$O$_{12}$Ti-OiPr (Ti POSS) and iBu$_7$Si$_7$O$_{12}$Ti—OH (TiOH POSS) have been used. Catalyst according to the present invention are represented by [Ti(POSS)1.33], [Ti(POSS)1.5] and [Ti(POSS)2].

The studied reaction in this case is between phenylisocyanate (PhNCO) and nBuOH in toluene at 20° C. at a molar ratio of PhNCO:nBuOH:Ti-POMS of 1000:1000:1 and a concentration of PhNCO of 0.1M. At regular time intervals, samples taken from these reaction mixture were analyzed by GC. Plots of conversion versus time show the relative reduction of PhNCO on a molar basis in the reactive composition during forming of the urethane, PhNCO being converted into a urethane, PhNHCOOnBu (See FIG. 3). From these data, rate constants are derived for further quantification of catalyst activity for urethane formation (See Table 1).

TABLE 1 catalyst activity for urethane formation

| entry | catalyst | relative rate on molar basis | relative rate on weight basis |
|---|---|---|---|
| 1 | Al POSS | 0.1 | 0.1 |
| 2 | TiOH POSS | 0.3 | 0.2 |
| 3 | Bu$_2$SnDL | 1 | 1 |
| 4 | Ti POSS | 2 | 1.4 |
| 5 | [Ti (POSS)$_{1.33}$] | 3.6 | 2.0 |
| 6 | [Ti (POSS)$_{1.5}$] | 4.4 | 2.2 |
| 7 | [Ti (POSS)]$_2$ | 4.7 | 1.8 |

Solubility of POMS in Polyol

To 25 mL of a 10 wt. % solution of a selected POMS compound in hexanes, toluene or THF is added 50 mL of a polyol compound. The mixture is stirred for 5-30 minutes at 20-60° C. followed by removal of the solvent under reduced pressure. The resulting polyol/5 wt. % POMS formulation is left to stand at 20° C. for one week. After this period the POMS is declared soluble in the polyol when the formulation is found to be clear (See Table 2).

TABLE 2

Solubility of POMS in polyol

| entry | POMS | Polyol | Soluble |
|---|---|---|---|
| 1 | Al POSS | Daltocel F428 | No |
| 2 | Al POSS | Daltocel F555 | No |
| 3 | Ti POSS | Daltocel F428 | No |
| 4 | Ti POSS | Daltocel F555 | No |
| 5 | [Ti (POSS)$_{1.5}$] | Daltocel F428 | Yes |
| 6 | [Ti (POSS)$_{1.5}$] | Daltocel F555 | Yes |
| 7 | iBu$_7$Si$_7$O$_9$(OH)$_3$ | Daltocel F428 | No |
| 8 | iBu$_7$Si$_7$O$_9$(OH)$_3$ | Daltocel F555 | No |

Synthesis of a Polyurethane—1

99.04 g of Daltocel F428 is mixed with 0.96 g of the POMS1.5 masterbatch (5 wt % of POMS1.5 in 95 wt % Daltocel F428) with a spatular in a vial to result in a mixture with a catalyst concentration of 0.04 mmol Titanium per 100 g of Daltocel F428. This blend is subsequently mixed with Suprasec 2420 in a weight ratio of 100/8.16. The viscosity built up of this blend was measured as a function of time at constant temperature, by an oscillation measurement using a Haake VT550 Rheometer with the following settings:
  Gap 1.000 mm
  Frequency: 1 Hz
  Angular Frequency: 10000 rad/s
  Spindle: Aluminium disposable plate; 20 mm diameter
  Temperature: set as a constant per measurement The same experiment was conducted with POMS1.0 and DBTDL as catalyst at the same concentration of catalyst (0.04 mmol metal per 100 g Daltocel F428).

The resulting viscosity-versus-time curves are shown in FIG. 1. It is apparent that the viscosity increase (a measure for the reactivity) for the POMS (Ti1.5) catalyst made with excess ligand is significantly increased compared to the POMS (Ti1.0) with a ligand to metal ratio of 1.

Synthesis of a Polyurethane—2

TABLE 3

| Product | Amount (Pbw) |
|---|---|
| Suprasec 2021 | 37 |
| Daltocel F435 | 36.92 |

TABLE 3-continued

| Product | Amount (Pbw) |
|---|---|
| Daltocel X F 460 | 43 |
| 1.4 BDO | 6.5 |
| Byk-W 969 | 0.95 |
| Black Repitan | 6.25 |
| POMS1.5* | 8 |

*5 wt % POMS1.5 dissolved in 95 wt % Daltocel F428

The polyol blend with together with the catalyst is prepared in polyethylene bottle and mixed well. 45 g of the polyol blend is weighed off in a 400 ml cup. 16.5 g isocyanate (Suprasec 2021) is added and mixed with a heidolph lab mixer for 10 seconds at 2500 rpm.

A thermocouple is inserted in the resin at approximately 1 cm below the surface to follow the temperature as a function of time. The resulting plot is show in FIG. 2.

The invention claimed is:

1. A method to form a polyurethane material, the method comprises the steps of:
providing at least one isocyanate;
providing at least one isocyanate reactive component;
providing a catalyst composition comprising metalized polyhedral oligomeric silsesquioxanes (POMS) compounds wherein:
said POMS compounds are reaction products of metallic alkoxides and silsesquioxane silanols corresponding to structure [2], and

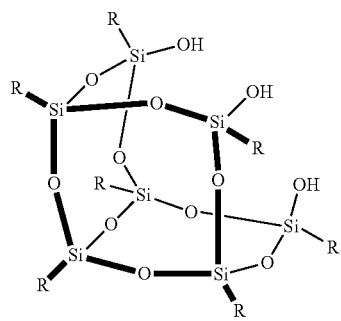

[2]

the number of equivalents of silsesquioxane silanols used is higher than the number of equivalents of metallic alkoxides used to react with said silsesquioxane silanols,
R is selected from an alkyl group comprising 1 to 20 carbon atoms; and
blending said at least one isocyanate, at least one isocyanate reactive component and said catalyst composition to form a blend and reacting said blend to provide said polyurethane material.

2. The method according to claim 1 wherein the metal in the metallic alkoxide in the catalyst composition is selected from a 4 and/or 5 coordinated metal which is selected from s, p, d, f, block metals.

3. The method according to claim 2, wherein the metal is selected from the group consisting of Ti, Zr, B, Al, and Sn.

4. The method according to claim 2, wherein the metallic alkoxide compound is titanium tetra alkoxide.

5. The method according to claim 1 wherein the ratio of the number of equivalents of silsesquioxane silanols over the number of equivalents of metallic alkoxides is in the range 1.5:1 up to 2:1.

6. The method according to claim 1 wherein the catalyst composition is a mixture comprising following intermediate POMS structures [8], [9], [10] and [11] in a dynamic equilibrium:

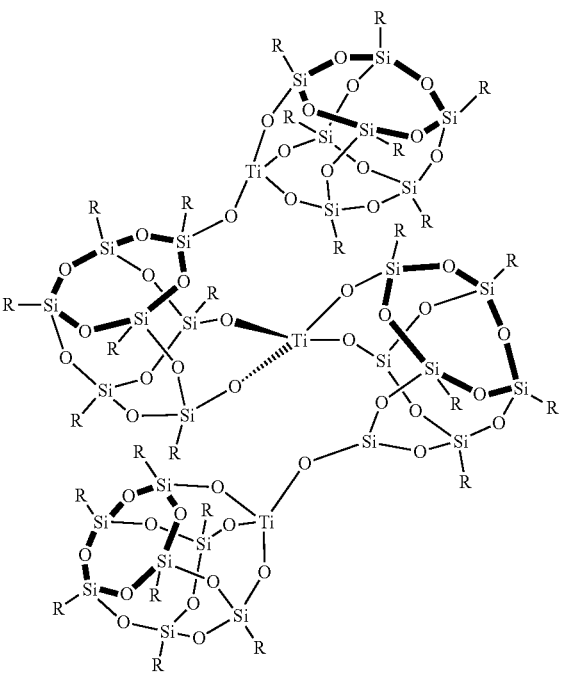

[8]

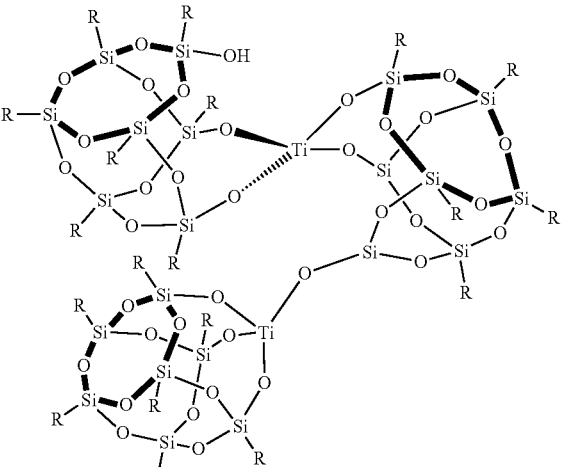

[9]

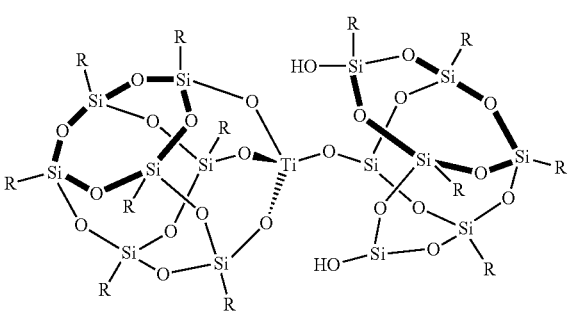

[10]

-continued

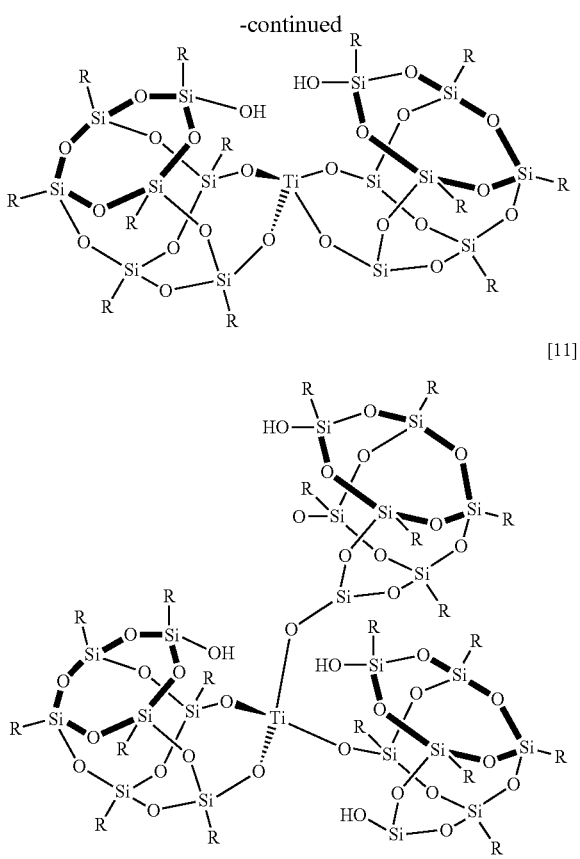

[11]

wherein R is selected from an alkyl group comprising 1 to 20 carbon atoms.

7. The method according to claim 1, wherein said metallized polyhedral oligomeric silsesquioxane is incorporated into an isocyanate reactive component before blending said at least one isocyanate, at least one isocyanate reactive component and said catalyst composition.

8. The method according to claim 1, wherein the isocyanate reactive component comprises monools, polyols, or combinations thereof.

9. The method according to claim 1, wherein the isocyanate reactive component is selected from monools or polyols which have an average nominal hydroxy functionality of 1-8 and an average molecular weight of 32-8000.

10. The method according to claim 1, wherein the isocyanate reactive component comprises methanol, ethanol, propanol, butanol, phenol, cyclohexanol, hydrocarbon monools having an average molecular weight of 200-5000, ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic polyols having a molecular weight of up to 8000, aliphatic polyols having a molecular weight of up to 8000, polyester polyols having an average molecular weight of 200-8000, polyether polyester polyols having an average molecular weight of 200-8000, polyether polyols having an average molecular weight of 200-8000, or combinations thereof.

11. The method according to claim 1, wherein the blending of said at least one isocyanate, at least one isocyanate reactive component and said catalyst composition is done at a temperature between −10° C. and 25° C.

12. The method according to claim 1, wherein said blend of said at least one isocyanate, at least one isocyanate reactive component and said metallized polyhedral oligomeric silsesquioxane is brought to a temperature between 25° C. and 200° C. to initiate the reaction of said at least one isocyanate, at least one isocyanate reactive component and said catalyst composition.

13. The method according to claim 1, wherein at least one gelling catalyst is provided to said blend of said at least one isocyanate, at least one isocyanate reactive component and said catalyst composition.

14. The method according to claim 1, wherein at least one blowing catalyst is provided to said blend of said at least one isocyanate, at least one isocyanate reactive component and said catalyst composition.

15. The method according to claim 1 wherein the concentration of said metallized polyhedral oligomeric silsesquioxane in said blend of said at least one isocyanate, at least one isocyanate reactive component and said catalyst composition is less than or equal to 10 mM.

16. A reactive composition, said reactive composition comprising:
 at least one isocyanate compound;
 at least one isocyanate reactive component;
 a catalyst composition according to claim 1.

* * * * *